United States Patent [19]

Narita et al.

[11] Patent Number: 4,636,879
[45] Date of Patent: Jan. 13, 1987

[54] VTR SYSTEM

[75] Inventors: Fujiaki Narita, Amagasaki; Sumio Tanaka, Itami, both of Japan

[73] Assignee: Ricoh Company, Ltd., Japan

[21] Appl. No.: 628,385

[22] Filed: Jul. 6, 1984

[30] Foreign Application Priority Data

Jul. 6, 1983 [JP] Japan .................................. 58-123664
Sep. 2, 1983 [JP] Japan .................................. 58-162402
Sep. 8, 1983 [JP] Japan .................................. 58-166303

[51] Int. Cl.$^4$ ............................................ G11B 15/18
[52] U.S. Cl. .................................................. 360/72.2
[58] Field of Search ............................. 360/72.2, 74.4

Primary Examiner—George G. Stellar
Attorney, Agent, or Firm—Guy W. Shoup

[57] ABSTRACT

In one aspect of the present invention, there is provided a video tape recorder system capable of finding a desired frame by carrying out a retrieval operation in two steps, coarse and fine, in which video tape on which is recorded addresses indicating respective locations on the tape is advanced at high speed using the upper digits of the addresses for coarse retrieval and then the tape is advanced at a speed for reproduction operation using the lower digits of the addresses for fine retrieval. In another aspect of the present invention, there is provided a unique adapter which allows to carry out a dubbing operation between two 8 mm video units directly therethrough. In a further aspect of the present invention, there is provided a portable type video tape recorder system in which a VTR main body and a tuner are provided as separate entities and a commonly usable power supply unit may be mounted in either of the VTR main body or the tuner.

6 Claims, 19 Drawing Figures

VTR SYSTEM

BACKGROUND OF THE INVENTION

1. Field of the Invention

This invention generally relates to a magnetic recording and reproducing system and in particular to a video tape recorder (VTR) or video cassette recorder (VCR) system.

2. Description of the Prior Art

In a prior art VTR system, in order to have a desired frame in a recorded video cassette shown on a monitor T.V. set, the number of revolutions of a tape reel holder provided in a VTR main body into which the cassette is inserted is counted and its progressively changing count value is displayed for visual observation by an operator. And then the operator changes the modes of operation, for example, between fast feed and rewind modes, thereby locating a desired frame or a desired recording track position on the video tape. However, according to this prior art method, the video tape advances over 10 to 20 fields for each revolution of the reel holder, thereby making it difficult to locate a desired recording track at high precision.

In accordance with an alternative prior art VTR system, an address unique to each field of video signal is recorded, together with a video signal, for each recording track of video tape, and this address is retrieved during reproduction mode. However, according to this prior art method, it is required to operate the VTR in reproduction mode so as to retrieve the address signal, which cannot be retrieved in fast feed or rewind mode, so that there is a disadvantage of requirement for significantly increased retrieval time period.

SUMMARY OF THE INVENTION

It is therefore a primary object of the present invention to obviate the disadvantages of the prior art as described above and to provide an improved magnetic recording and reproducing system.

Another object of the present invention is to provide a magnetic recording and reproducing system, such as a video tape recorder system, which is capable of locating a desired information recorded on a recording medium, such as magnetic tape, rapidly as well as accurately.

A further object of the present invention is to provide a magnetic recording and reproducing system, such as a video tape recorder system, which is capable of carrying out dubbing between 8 mm video cameras with ease and without deterioration of video image.

A still further object of the present invention is to provide an improved video tape recorder system which is capable of carrying out dubbing between 8 mm video cameras of the same kind through the use of a single reproduction adapter.

A still further object of the present invention is to provide an improved portable type video tape recorder system.

A still further object of the present invention is to provide an improved portable type video tape recorder system, including separately provided VTR main body and tuner, whose voltage supply is significantly simplified in structure.

Other objects, advantages and novel features of the present invention will become apparent from the following detailed description of the invention when considered in conjunction with the accompanying drawings.

BRIEF DESCRIPTION OF THE DRAWINGS

FIG. 3b is a schematic illustration showing on an enlarged scale the details of a portion of the video signal shown in FIG. 3a;

DESCRIPTION OF THE PREFERRED EMBODIMENTS

Figure 1:
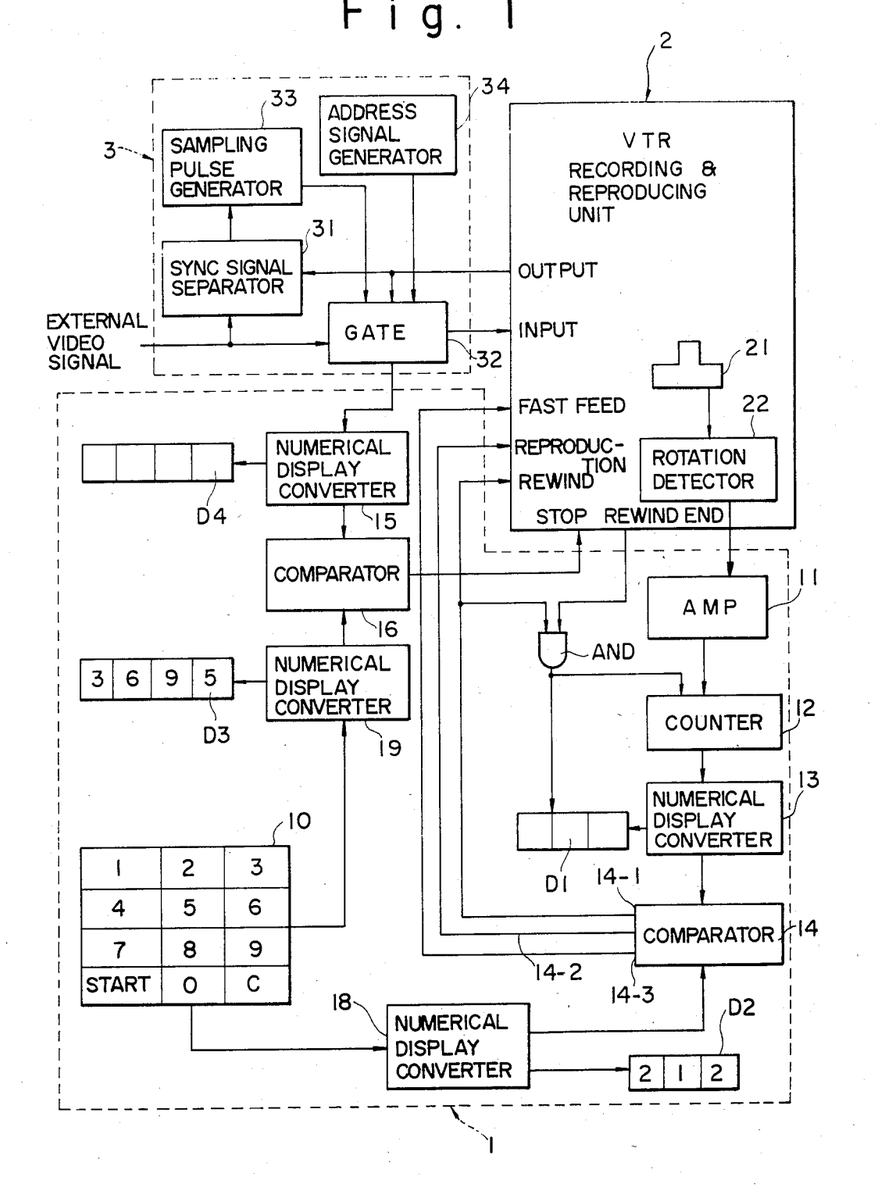
FIG. 1 is a block diagram showing a video tape recorder system constructed in accordance with one embodiment of the present invention.
Figure 2:
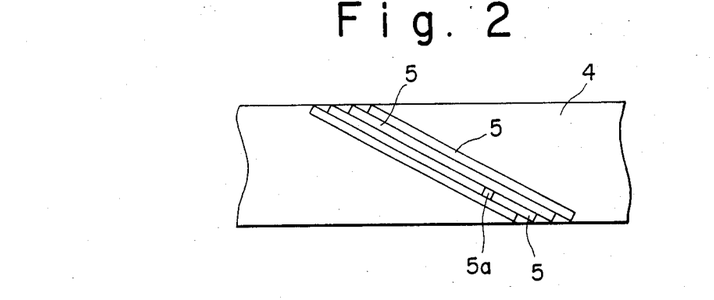
FIG. 2 is a schematic illustration showing the position of an address signal recorded on video tape for use in the system shown in FIG. 1.

Referring now to FIGS. 1 through 4, there is shown a video tape recorder system ( also referred to as video cassette recorder system ) constructed in accordance with one embodiment of the present invention, which allows to locate a desired frame rapidly as well as accurately. FIG. 1 schematically shows the overall structure of a single VTR main body, which comprises a retrieving circuit 1, a well-know VTR recording and reproducing unit 2 and an address signal processing circuit 3. As will become clear later, the address signal processing circuit 3 records an address signal A as shown in FIGS. 3a and 3b at a predetermined position, such as position 5a corresponding to the vicinity of blanking period, of each video track on a video tape 4 shown in FIG. 2, or alternatively, the address signal processing circuit 3 reproduces the address signal A recorded on the tape 4.

Figure 3A:
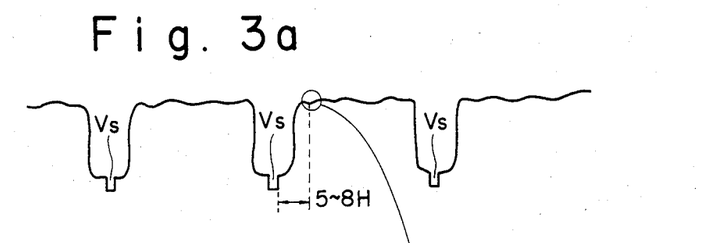
FIG. 3a is a schematic illustration showing the position of an address signal contained in a video signal.
Figure 3B:
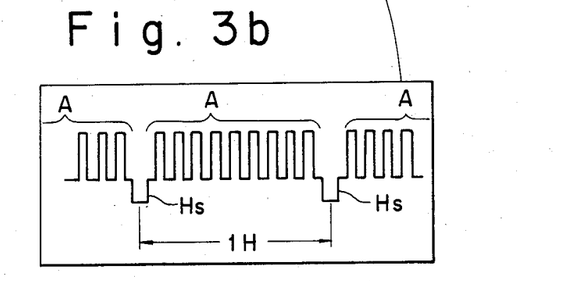

The address signal processing circuit 3 includes a sync signal separating circuit 31 which serves to separate out a vertical sync signal Vs and a horizontal sync signal Hs from a video signal supplied from the VTR recording and reproducing unit 2 to be supplied to a sampling pulse generating circuit 33. Based on the vertical and horizontal sync signals Vs and Hs, the sampling pulse generator 33 generates a sampling pulse having the length of 2-3 H at a location after 5 -8 horizontal scanning periods (H) from each vertical sync singal Vs of video signal, as shown in FIGS. 3a and 3b, and this sampling pulse is applied to a gate 32. The address signal processing circuit 3 also includes an address signal generator 34 which supplies an address signal A comprised of a plurality of pulses indicating, for example, the address allotted to each field of video signal to the gate 32.

The VTR recording and reproducing unit 2 includes a reel holder 21 for holding thereon a video cassette when inserted in position, which executes reproduction, fast feeding and rewinding of video tape. The reel holder 21 is provided with a rotation detector 22 which outputs a rotation detection pulse each time when the reel 21 rotates over a predetermined angle. The rotation detection pulse thus produced is supplied to the retrieving circuit 1. It is to be noted that the rotation detector 22 may be of the optically detecting type, magnetically detecting type or any other desired type well known for those skilled in the art.

The retrieving circuit 1 includes a keyboard 10 for designating an address to be accessed, and a desired frame is retrieved based on an address data inputted by the keyboard 10 and a rotation detection pulse from the reel holder 21. The retrieving circuit 1 includes an amplifier 11 for amplifying a signal supplied from the rotation detector 22, and an output terminal of the amplifier 11 is connected to a counter 12 which counts the number of pulses from the rotation detector 22, thereby outputting a data indicating the amount of rotation of the reel holder 21, or the approximate position (hereinafter, also referred to as current position of video track) of a track on the video tape opposite to a VTR recording and reproducing head (not shown). In the present embodiment, this current position data consists of the upper three digits of an address data indicated by a seven-digit decimal number. An output from the counter 12 is supplied through a numerical display converter 13 to a first display D1 for displaying the top three digits of the address data and to a first comparator 14.

On the other hand, the keyboard 10 is connected to a numerical display converter 18 which takes out the top three digits of the address data and which is also connected to the first comparator 14. The numerical display converter 18 is also connected to a second display D2 which displays the top three digits of the address data.

At the first comparator 14, an output from the counter 12, i.e., top three digits X1 of the address data indicating the current position of video track, is compared with top three digits Y1 of the address data set through the keyboard 10, and output "1" is produced at a terminal 14-1 if X1 is smaller than Y1, at a terminal 14-2 if X1 is equal to Y1, or at a terminal 14-3 if X1 is larger than Y1. These output terminals 14-1, 14-2 and 14-3 are respectively connected to the VTR recording and reproducing unit 2 for establishing fast feed, reproduction and rewind modes of operation, selectively.

The keyboard 10 is also connected to a numerical display converter 19 which takes out the bottom four digits from the address data set by the keyboard 10, and the numerical display converter 19 is connected to a second comparator 16 and also to a third display unit D3 which displays the bottom four digits of the address data. The second comparator 16 is connected to an output terminal of a numerical display converter 15 which takes out the lower four digits from the address data supplied from the gate 32. The numerical display converter 15 is also connected to a fourth display unit D4 which displays the bottom four digits of the address indicating the current position of video track. The second comparator 16 supplies as its output signal "1" if the bottom four digits of the address data set by the keyboard 10 coincides with the bottom four digits of the address data indicating the current position of video track, and this signal "1" is applied to a "STOP" input terminal of the VTR recording and reproducing unit 2.

Figure 4:
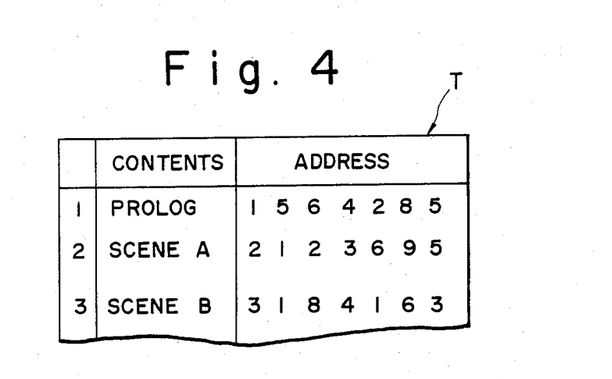
FIG. 4 is a table showing the correspondence between recorded image and address.

With the above-described structure, assuming that the video cassette now inserted in position stores a source according to the address indicated in the table shown in FIG. 4, if it is desired to retrieve "SCENE A", the address "2123695" corresponding to SCENE A is inputted through the keyboard 10. Then, the display unit D2 displays the top three digits "212§ of the above address; whereas, the display unit D3 displays the bottom three digits "3695" of the above address. On the other hand, a video track of a cassette now inserted in position in the VTR recording and reproducing unit 2 takes an arbitrary position depending on the operation of the VTR itself, and the counter 12 has its count set to the top three digits of address of that video track so that the display unit D1 displays the top three digits of address of that track. The first comparator 14 compares the count in the counter 12 with the top three digits of the set address data. If the current address of video track is smaller than the set address, a fast feed mode of operation is established to feed the video tape at high speed. On the contrary, if the current address of video track is larger than the set address, then there is established a rewind mode of operation. Then, if the numbers displayed on display units D1 and D2 become identical, the comparator 14 causes switching to a reproduction mode at a location approximately 3-6 counts before the field of video signal corresponding to the frame of "SCENE A".

As a result, a reproduced video signal is supplied to the sync signal separator 31 and gate 32 of the address signal processing circuit 3. The sync signal separator 31 separates out a vertical sync signal Vs and a horizontal sync signal Hs from this video signal, which are supplied to the sampling pulse generator 33. In response to the sync signals Vs and Hs inputted, the sampling pulse generator 33 generates a sampling pulse which indicates timing to sample an address signal from the video signal to be supplied to the gate 32. In response to this sampling pulse, the gate 32 samples or takes out an address signal indicating the current position of video track and supplies it to the numerical display converter 15.

Then, at the retrieving circuit 1, the numerical display converter 15 converts this address signal into 4-bit address data which is then supplied to the fourth display unit D4 and to the second comparator 16. At the second comparator 16, the address data indicating the current position of video track is compared with the bottom four digits of the set address data. When the two data coincide, the comparator 16 supplies "1" as its output by regarding that the video track has been reproduced up to a position corresponding to a frame of "SCENE A", thereby causing the reproduction operation of the VTR recording and reproducing unit 2 to stop. In this manner, a frame corresponding to desired "SCENE A" can be retrieved rapidly as well as accurately.

Incidentally, if the video tape is rewound to the initial position before retrieval, a reset signal is applied to both counter 12 and display unit D1, whereby the count of counter 12 and the display of display unit D1 are automatically reset corresponding to the initial position of video tape.

As described in detail above, in accordance with this aspect of the present invention, the video tape is first advanced until a desired position of the tape is coarsely detected by first detecting means provided in a mechanism for advancing the video tape, and, then, the desired position is finely detected by means of second detecting means for detecting an address recored on the tape itself. Thus, a desired position of the tape can be retrieved extremely accurately as well as rapidly.

Now, another aspect of the present invention will be described below. An 8 mm video unit is a combination of a T.V. camera and a magnetic recording device, and it is so structured from the view point of compactization, simplicity in circuit design, etc. that a color difference signal (R-Y) and (B-Y) obtained from a T.V. camera is directly converted to a color signal of low frequencies, for example, in the neighborhood of 700 kHz, which is then, after having been multiplexed with a FM-modulated luminance signal, recorded on magnetic tape via a magnetic recording head, or recorded information is reproduced on a T.V. receiver via an adapter.

Figure 5:
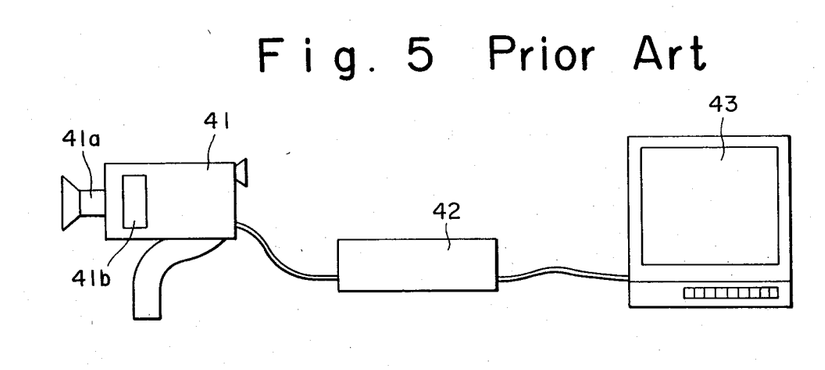
FIG. 5 is a schematic illustration showing the overall structure of a typical prior art 8 mm video tape recorder system.

FIG. 5 illustrates a prior art video system of the above-described type, which includes an 8 mm video unit 41, a reproduction adapter 42 and a T.V. receiver 43. The 8 mm video unit 41 is capable of recording image information obtained by a camera 41a on magnetic tape 41b and of reproducing recorded image information on the T.V. receiver 43 through the reproduction adapter 42.

Figures 6, 6A:
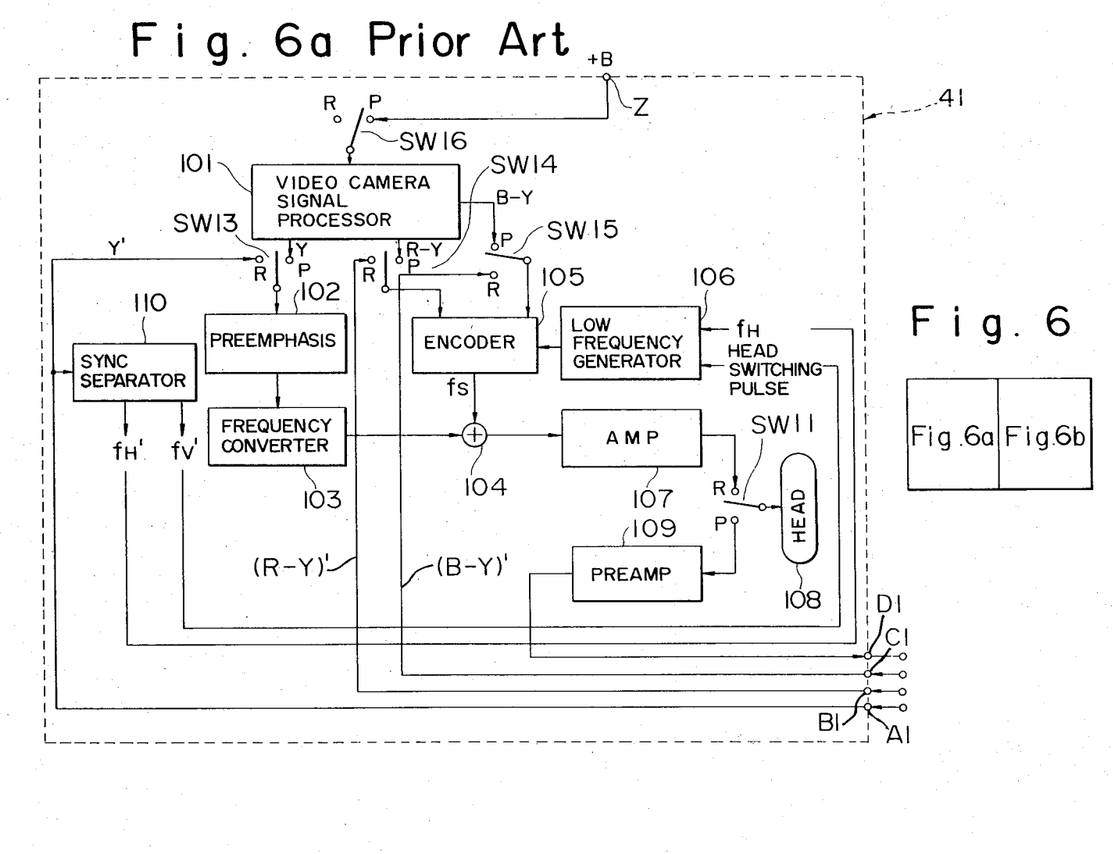
FIG. 6 shows how FIGS. 6a and 6b should be combined and FIGS. 6a and 6b are block diagrams showing, when combined as indicated in FIG. 6, the structure of a prior art 8 mm video device and reproduction adapter.
Figure 6B:
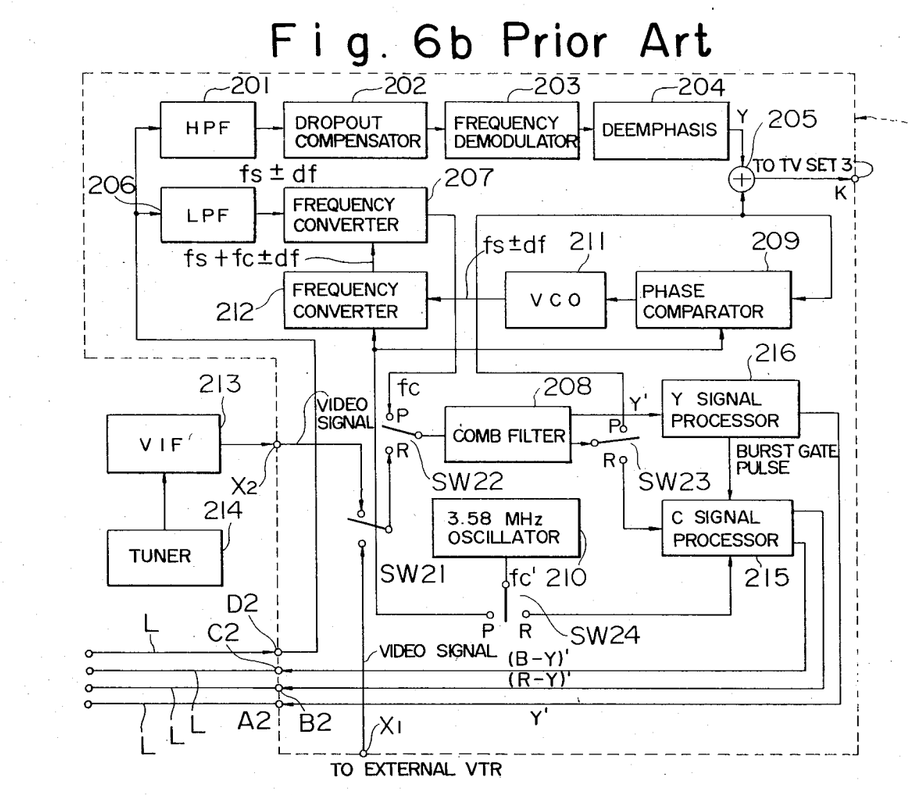

FIG. 6 shows how FIGS. 6a and 6b should be combined, and FIGS. 6a and 6b, when combined as indicated in FIG. 6, shows in block form the overall structure including the 8 mm video unit 41 and the reproduction adapter 42, which has been previously proposed by the assignee of this application.

The 8 mm video unit shown in FIGS. 6a and 6b includes an input terminal for receiving an externally applied video signal, a signal processing circuit for recording for processing the video signal and a filter for separating the video singal into a luminance signal and a color signal, whereby the filter is commonly used for a signal processing circuit for reproducing a camera singal and for the above-mentioned signal processing circuit for recording video signal, thereby allowing to have external information for T.V. set arbitrarily recorded in a recording section of an 8 mm video unit or any other similar unit.

As shown, the 8 mm video unit 41 includes a video camera signal processing circuit 101 for processing a video signal of an image obtained by the camera 41a, which supplies as its outputs a luminance signal Y and color difference signals R-Y and B-Y of the image. The luminance signal Y applied to a contact point P for reproduction of a switch SW13 is inputted into a preemphasis circuit 102, where the signal is amplified to a predetermined value, and then the amplified signal is supplied to a frequency converter 103 where the signal is converted to a low frequency carrier FM signal, which, in turn, is applied to an adder 104. On the other hand, color difference signals R-Y and B-Y, which are applied to contact points P, P of switches SW14 and SW15, respectively, are inputted to an encoder 105 through the respective switches. The encoder 105 also receives a low frequency signal supplied from a low frequency generator 106, the phase of which low frequency signal is controlled by a horizontal sync signal $f_H$ of camera signal and a head switching pulse. Thus, at the encoder 105, the color difference signals R-Y and B-Y are converted to a low frequency-converted color signal $f_S$ by this low frequency signal, and the signal $f_S$ is applied to the adder 104.

As a result, the FM-modulated luminance signal and the low frequency-converted color signal $f_S$ are added at the adder 104 and the thus added signal is applied as a RF signal to a recording amplifier 107. After amplification, the signal is supplied to a magnetic recording head 108 through a contact point R of switch SW11. A composite signal of luminance and color signals supplied to the recording head 108 is thus recorded on magnetic tape 41b. During reproduction of magnetic tape 41b, the switch SW11 is turned to be in contact with contact point P, and, thus, a reproduction signal is supplied from the recording head 108 to a preamp 109 through the switch SW11, where the signal is amplified. And, then, the thus amplified signal is supplied to the reproduction adapter 42.

The reproduction adapter 42 is shown in block form in FIG. 6b and it includes a high pass filter 201 which receives a video signal supplied from the 8 mm video unit 41 to extract an FM-modulated signal. If dropout is present in the FM-modulated signal, it is compensated by a dropout compensator 202 which follows the HPF 210. An output signal from the dropout compensator 202 is supplied to a frequency demodulator 203 where the signal is converted to a luminance signal, which is then treated by a deemphasis circuit 204 thereby having noise components suppressed. The deemphasized signal is then supplied to an adder 205.

The reproduction adapter 42 also includes a low pass filter 206 which produces a color signal $f_S \pm$ df having frequency fluctuating components $\pm$ df by subjecting the video signal to low frequency conversion. This low frequency-converted color signal $f_S \pm$ df is then converted to carrier chrominance signal $f_C$ stable in phase by a frequency converter 207. Then, in order to eliminate crosstalk with the information of adjacent tracks, an output signal from the converter 207 is supplied to a comb filter 208 via a contact point P for reproduction of switch SW22 and at the same time to the adder 205 via a contact point P for reproduction of switch SW23.

The above-described carrier chrominance signal $f_C$, which is stable in phase, may be obtained as in the following manner. After passing through the comb filter 208, the carrier chrominance signal $f_C$ with its color burst signal removed is applied to a phase comparator 209 via a switch SW23. The phase comparator 209 compares the phase of carrier chrominance signal $f_C$ outputted from the frequency converter 207 with the phase of a reference signal $f_C$ outputted from a 3.58 MHz reference oscillator 210 via a contact point P for reproduction of switch SW24, and thus a voltage-controlled oscillator 211 is controlled by a phase difference voltage supplied from the phase comparator 209. VCO 211 supplies as its output a signal of frequency $f_S \pm$ df, which cancels the above phase difference, to be applied to the frequency converter 212. At the frequency converter 212, an output $j_S \pm df$ from VCO 211 is combined with an output $f_C'$ from the 3.58 MHz reference oscillator 210, thereby outputting a signal having the frequency of $f_S + f_C \pm df$ to be applied to the frequency converter 207. As a result, at the frequency converter 207, the signal component $f_S \pm df$ passing through LPS 206 is subtracted from the output $f_S + f_C \pm df$ from the converter 212, thereby producing the carrier chrominance signal $f_C$ which is in synchronism with the output $f_c'$ from 3.58 MHz reference oscillator 210.

At the adder 205, the carrier chrominance signal $f_C$ and the luminance signal Y are added to produce a video signal which is transmitted to the T.V. receiver 43 through an output terminal K.

On the other hand, in the case of recording a video signal supplied from an external video tuner 214 or a video tape recorder, input terminals A1, B1 and C1 of 8 mm video unit 41 are first electrically connected to output terminals A2, B2 and C2 of adapter through interconnection lines L. In the adapter 42, the switches SW22, SW23 and SW24 are all turned to contact points R for recording. A video signal inputted through an input terminal X1 or X2 is supplied to the comb filter 208 through switches SW21 and SW22, where the signal is separated into a color signal and a luminance signal, with the color signal being supplied to a C signal processing circuit 215 through the switch SW23. On the other hand, the luminance signal is supplied to a Y signal processing circuit 216. At the Y signal processing circuit 216, the time delay of luminance signal with respect to color signal is compensated thereby producing compensated luminance signal Y' which is supplied to the 8 mm video unit 41 through the terminals A1 and A2. At the same time, from this luminance signal Y' is separated a horizontal sync signal which is then supplied to the C signal processing circuit 215 as a burst gate pulse.

At the C signal processing circuit 215, the reference signal $f_C'$ supplied from the 3.58 MHz reference oscillator 210 through the switch SW24 and the burst gate pulse from the Y signal processing circuit 216 are used to have the color signal converted to color difference signals (R-Y)' and (B-Y)', which are then supplied to the 8 mm video unit 41 through terminals B1, B2, C1 and C2.

At the 8 mm video unit 41, the switches SW13, SW14 and SW15 are turned to contact points R for recording, i.e., to the adapter 42, so that the luminance signal Y' is supplied to the preemphasis circuit 102 through the switch SW13 from the Y signal processing circuit 216. In addition, color difference signals (R-Y)' and (B-Y)' are supplied to the encoder 105 from the C signal processing circuit 215 via the switches SW14 and SW15. In response to horizontal sync signal $f_H'$ and head switching pulse from the sync separator 110, the low frequency generator 106 supplies a phase-controlled low frequency signal to the encoder 105. At the encoder 105, the color difference signals (R-Y)' and (B-Y)' from the adapter 42 are converted to a low frequency-converted color signal $f_S'$ based on the low frequency signal from the low frequency generator 106.

Thereafter, similarly with the case of processing a signal from the video camera signal processing circuit 101, the above-mentioned luminance signal Y' and the low frequency-converted color signal $f_S'$ are processed and recording is carried out on the magnetic tape 41b.

It is to be noted that the switches SW21-SW23 and SW13-SW16 are so structured that they are switched automatically when the T.V. tuner 214 or VTR is plugged into the input terminal X1 or X2 of adapter 42. In an alternative structure, all of these switches may be operated at the same time by a single turn-over switch (not shown) provided at the exterior of the unit main body.

As may have been understood, in the 8 mm video system described above, a circuit for processing an externally applied video signal to be converted into a luminance signal and a color difference signal is provided in an adapter, and, thus, an externally applied video signal other than a camera signal can be recorded in a recording section of 8 mm video unit through the adapter of the present invention. In addition, the adapter is provided with a switching means for switching the filter means for separating out a luminance signal and a color signal thereby allowing to use the filter means for recording of an externally applied video signal and for recording and reproducing of camera signal.

Figure 7:
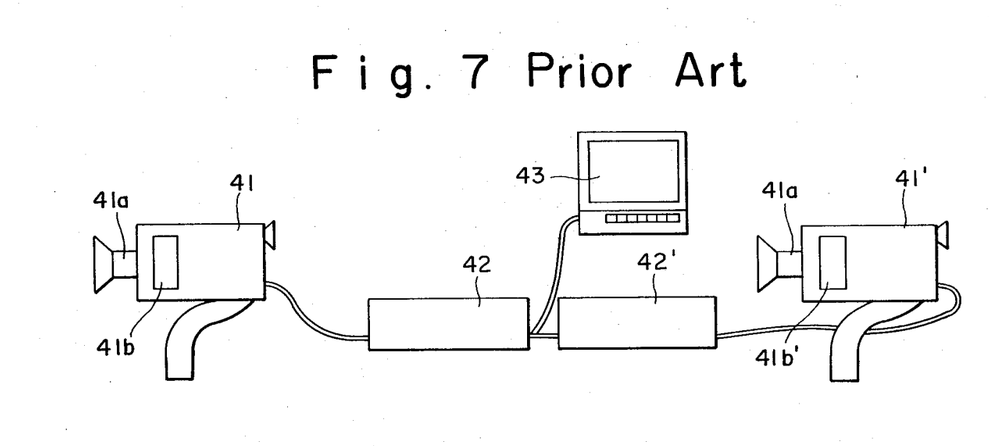
FIG. 7 is a schematic illustration showing how dubbing between two 8 mm video cameras is carried out using the prior art video tape recorder system.

However, with the above-described 8 mm video unit, if it is desired to carry out dubbing between two 8 mm video units 41, they must be connected as shown in FIG. 7. That is, an output terminal D1 for reproduction signal of 8 mm video unit 41 for reproduction is connected to an input terminal D2 for reproduction signal of the reproduction adapter 42. Besides, a video signal output terminal K of reproduction adapter 42 is connected to an external input terminal X1 of another reproduction adapter 42' as well as to the T.V. receiver 43, and output terminals A2, B2 and C2 of the reproduction adapter 42' are connected to output terminals A1, B1 and C1 of the 8 mm video unit 41' for recording, respectively. In addition, the switches in the reproducing adapter 42 are turned to play contact points P and the switches in the recording adapter 42' are turned to recording contact points R.

Under the condition, the magnetic tape 41b of reproducing 8 mm video unit 41 is reproduced and a reproduced signal is supplied to the adapter 42. As described previously, this reproduction signal is then separated into a FM signal and a low frequency-converted color signal with the FM signal being demodulated to a luminance signal and the low frequency-converted color signal being frequency-converted to a carrier chrominance signal. And, these luminance and carrier chrominance signals are combined as a standard NTSC color signal by the adder 205 and the combined signal is supplied from a terminal K as a video signal to an input terminal X1 of recording adapter 42' and to the T.V. receiver 43. This video signal is shown as an image on the T.V. receiver 43 thereby allowing to monitor the image being dubbed.

In the adapter 42', this video signal is again separated into a luminance signal and a color signal by the comb filter 208 with the luminance signal being supplied to the 8 mm video unit 41' as being compensated by the Y signal processing circuit 216 and the color signal being converted to a color difference signal by the C signal processing circuit 215 to be supplied to the recording 8 mm video unit 41'. At the 8 mm video unit 41', these luminance and color difference signals are combined to produce a video signal which is then recorded on magnetic tape 41b'.

As set forth above, in carrying out dubbing between the above-described 8 mm video units, the luminance and color signals obtained as separated from a reproduction signal are once combined to form a standard NTSC video signal which is again separated into luminance and color signals for recording. Thus, there occurs a deterioration in signal during such a repeated conversion process. Besides, two adapters are required to carry out a dubbing operation, which is cumbersome and requires skills and experiences.

Figure 8:
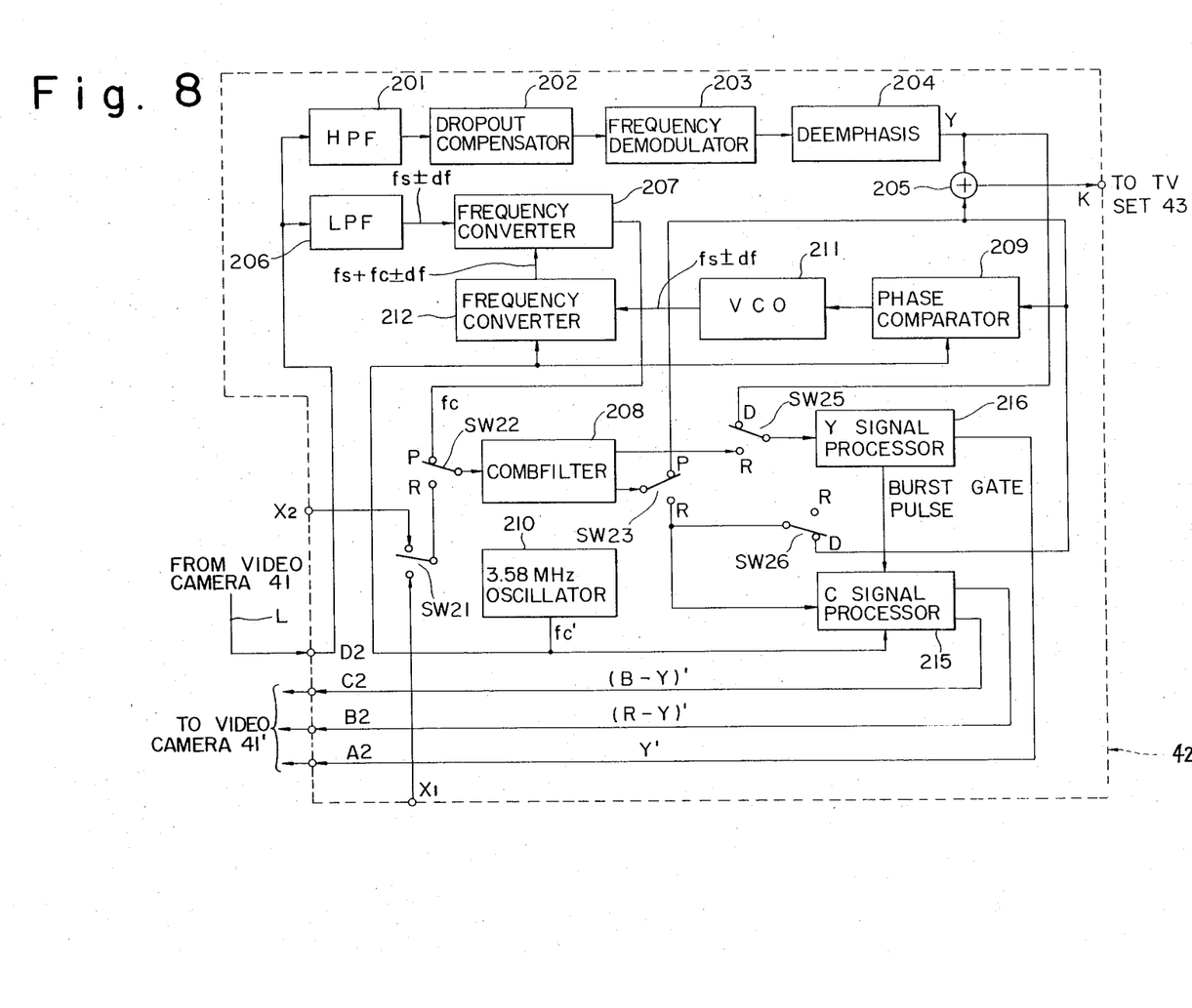
FIG. 8 is a block diagram showing the overall structure of reproduction adapter embodying the present invention.

In accordance with the present invention, there is provided a magnetic recording and reproducing system capable of carrying out dubbing between two 8 mm video units using only a single reproduction adapter without causing deterioration in image quality. FIG. 8 shows such an adapter constructed in accordance with one embodiment of the present invention. It is to be noted that the adapter of FIG. 8 is structurally similar to the adapter shown in FIG. 6 and thus similar elements are indicated by similar reference numerals. As compared with the structure shown in FIG. 6, the structure shown in FIG. 8 includes additional turn-over switches SW25 and SW26 while eliminating the turn-over switch SW24 for the 3.58 MHz oscillator 210.

The turn-over switch SW25 has a contact point D for dubbing, which is connected to the output terminal of deemphasis circuit 204, and the other contact point R for recording, which is connected to the output terminal of comb filter 208. The switch SW25 has its common terminal connected to the Y signal processing circuit 26. With the provision of such switch SW25, during recording of a video signal supplied, for example, from the T.V. tuner 214, the switch SW25 has its common contact connected to the R contact, so that the luminance signal separated out from this video signal by the comb filter 208 is supplied to the Y signal processing circuit 216. On the other hand, during dubbing between two 8 mm video units 41 and 41, the switch SW25 has its common contact connected to the D contact, so that the luminance signal separated out from a reproduction signal supplied from the 8 mm video unit 41 for reproduction mode is supplied to the Y signal processing circuit 216 through the deemphasis circuit 204.

The other additional switch SW26 has a contact point D, which is connected to the contact point P for reproduction of switch SW23, and the other contact point R which is not connected to any other portion and thus floating. The switch SW26 has its common contact point connected to the input terminal of C signal processing circuit 215. With the provision of the switch SW26, during recording of an image supplied, for example, from the T.V. tuner 214, the switches SW23 and SW25 have their common contact connected to the R contact, so that the color signal separated out from a video signal from the T.V. tuner 214 by the comb filter 208 is supplied to the C signal processing circuit 215. On the other hand, during dubbing between two 8 mm video units 41 and 41, the switches SW22 and SW23 have their common contact connected to the P contact and the switch SW26 has its common contact connected to the D contact, so that the color signal separated out from a reproduction signal from the 8 mm video unit 41 is supplied to the C signal processing circuit 215 from the frequency converter 207 through the switch SW22, comb filter 208, and switches SW23 and SW26.

It is to be noted that it is preferably so structured that the switches SW25 and SW26 are operated, for example, by a manually operable switch provided at the exterior of the main body.

In the structure shown in FIG. 8, the output terminal of 3.58 MHz oscillator 210 is connected to the frequency converter 212, to the phase comparator 209 and to the C signal processing circuit 215. With this structure, a chrominance subcarrier signal $f_C$ is supplied from the 3.58 MHz oscillator 210 to the phase comparator 209 and to the frequency converter 207 as a reference signal for converting the low frequency-converted color signal $f_S \pm$ df among a reproduction signal from the 8 mm video unit 41 to the color signal $f_C$ stable in phase. In addition, the chrominance subcarrier signal $f_C'$ is also supplied to the C signal processing circuit 215 as a reference signal for converting the color signal to a color difference signal.

In carrying out a dubbing operation between two 8 mm video units using the reproduction adapter 42 having the above-described structure, the output terminal D1 of reproducing 8 mm video unit 41 is connected to the input terminal D2 of reproduction adapter 42 of FIG. 8 through an interconnection line L. Moreover, the output terminals A2, B2 and C2 of reproduction adapter 42 of FIG. 8 are respectively connected to the input terminals A1, B1 and C1 of recording 8 mm video unit 41' through the interconnection line L, and the output terminal K of reproduction adapter 42 is connected to the T.V. receiver 43.

In the first place, the magnetic tape 41b mounted in the reproducing 8 mm video unit 41 is read by the magnetic recording head 108 and its reproduction signal is supplied to the input terminal D2 of reproduction adapter 42 of FIG. 8 through the output terminal D1 of 8 mm video unit 41. In the reproduction adapter 42, the switches SW22 and SW23 each have their common contact connected to the P contact and the switches SW25 and SW26 each have their common contact connected to the D contact. Thus, the reproduction signal thus inputted is supplied to HPF 201 where a FM signal is extracted, which is then supplied through the dropout compensator 202 to the frequency demodulator 203 to be converted to a luminance signal. Then, this luminance signal is supplied to the Y signal processing circuit 216 through the switch SW25 and also to the adder 205.

The reproduction signal is also supplied to the low pass filter 206 which outputs a low frequency color signal $f_S \pm df$ which is then converted to a carrier chrominance signal $f_C$ by passing through the frequency converter 207. The carrier chrominance signal $f_C$ is then inputted into the comb filter 208 through the switch SW22, where a color burst signal is extracted, and then supplied to the adder 205 through the switch SW23 and also to the C singal processing circuit 215 through the switch SW26. At the adder 205, the incoming luminance and color signals are combined to form a standard NTSC video signal which is then supplied through the output terminal K to the T.V. receiver 43 for visual reproduction.

On the other hand, the luminance signal supplied to the Y signal processing circuit 216 through the switch SW25 is supplied, after having its time delay corrected, to the input terminal A1 of recording 8 mm video unit 41' through the output terminal A2. The color signal supplied to the C signal processing circuit 215 is converted to color difference signals (B-Y)' and (R-Y)', which are supplied to the input terminals B1 and C1 of recording 8 mm video unit 41' through the output terminals B2 and C2. The luminance and color difference signals supplied to the recording 8 mm video unit 41' are processed as described previously and then supplied to the adder 104 thereby forming a recording RF signal, which is recorded on the magnetic tape 41b' mounted in the 8 mm video unit 41'.

In this manner, in the above-described embodiment, dubbing between two 8 mm video units 41 and 41 can be easily carried out using a single reproduction adapter 42. Moreover, since it is so structured that the luminance and color signals separated out from a reproduction signal from the reproducing 8 mm video unit 41 in the reproduction adapter 42 are directly supplied to the recording 8 mm video unit 41' as being separated, the signals are prevented from being deteriorated significantly.

Now, a further aspect of the present invention will be described below. This aspect of the present invention relates to a portable type VTR system in which a tuner is provided separately from a VTR main body.

Figure 9:
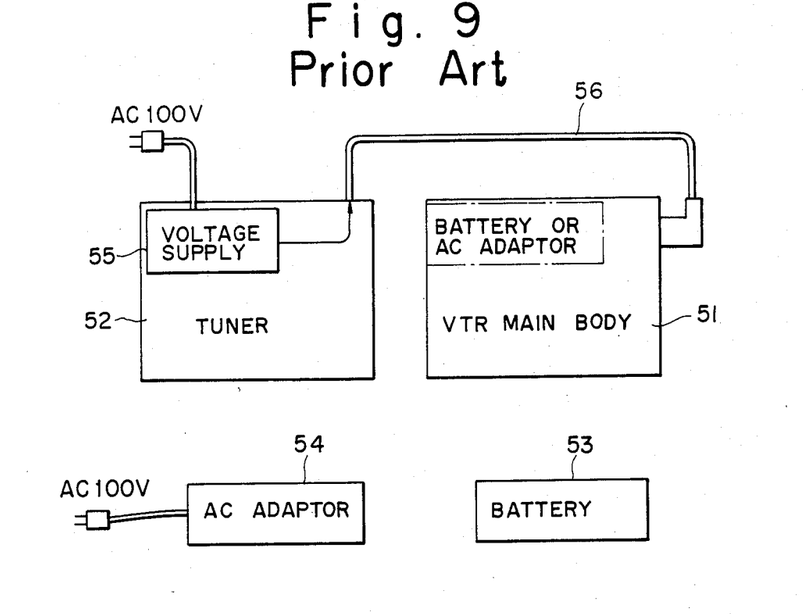
FIG. 9 is a schematic illustration showing the overall structure of a typical prior art portable type video tape recorder system.

FIG. 9 shows a prior art portable VTR system which is a combination of a VTR main body 51 and a tuner ( including those having a built-in timer ) 52. In the case where the VTR main body 51 is to be used by itself, for example, for reproduction operation or recording by a camera, a battery 53 or an A.C. adapter 54 is inserted into the VTR main body 51 for supplying power to the VTR main body 51. The A.C. adapter 54 is to be hooked to a commercial line voltage of A.C. 100 V and it supplies a required D.C. voltage to the VTR main body 51. In the illustrated example, in order to provide exchangeability between the battery 53 and the A.C. adapter 54, their outer shapes and sizes are identical.

The tuner 52 is provided with a voltage supply 55 to be connected to a commercial line voltage of A.C. 100 V and the voltage supply provides required voltages not only to various parts of the tuner 52, but also to the VTR main body 51 through a connector and cable 56. Thus, if a T.V. program is to be recorded using the tuner 52, the battery 53 and A.C. adapter 54 are not necessary. However, in such a prior art VTR system, although the tuner 52 includes a built-in power supply 55, it is necessary to keep the battery 53 and/or A.C. adapter 54 ready for the case in which the VTR main body 51 is used by itself. Thus, the system tends to be expensive.

Figure 10:
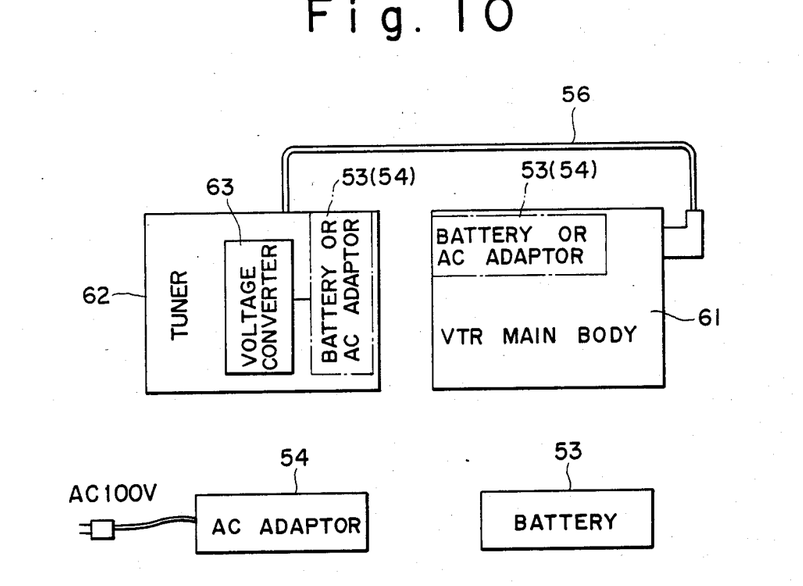
FIG. 10 is a schematic illustration showing the overall structure of a portable type video tape recorder system embodying the present invention.

Under the circumstances, this aspect of the present invention is directed to improvements in such a portable type VTR system in which a tuner is provided separately from a VTR main body. FIG. 10 shows a portable type VTR system constructed in accordance with one embodiment of the present invention, and the present system includes a tuner 62 which is not provided with a built-in power supply. The tuner 62 is so structured that the separate A.C. adapter 54 or battery 53 may be inserted in position as a power supply. It is to be noted that the A.C. adapter 54 or battery 53 is the one which may also be used for a VTR main body 61. The tuner 62 is also provided with a voltage converter 63 which converts the voltage supplied from the A.C. adapter 54 or battery 53 to various levels of voltages required at various parts of the tuner 62.

Figure 11:
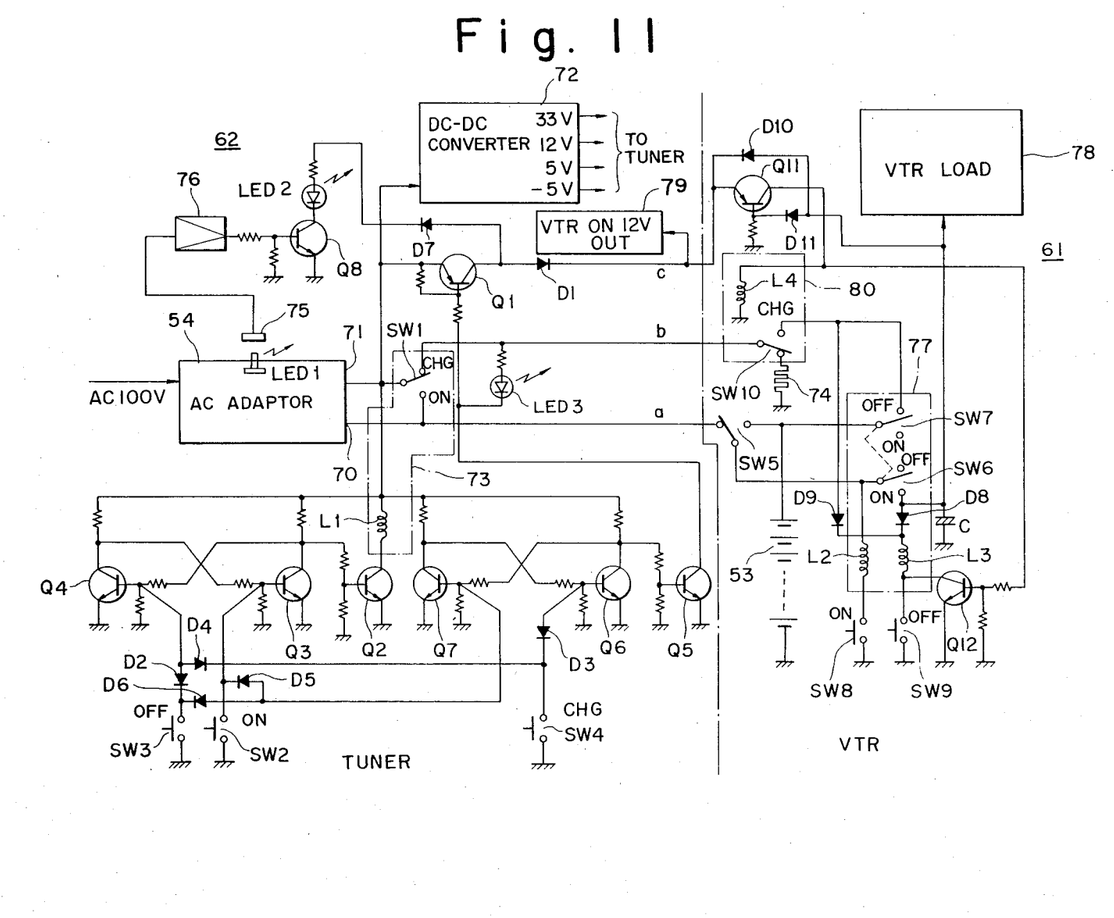
FIG. 11 is a circuit diagram showing the detailed structure of the present portable type video tape recorder system.

FIG. 11 shows a main circuit for supplying a voltage constructed in accordance with one embodiment of the present invention, in which the A.C. adapter 54 is inserted in position in the tuner 62 and the battery 53 is inserted in position in the VTR main body 61. When inserted in position in the tuner 62, the A.C. adapter 54 comes to be electrically connected to the tuner 62 through its D.C. 12 V output terminal 70 and battery recharging output terminal 71. The A.C. adapter 54 includes a LED1 which is a light emitting diode for emitting light when supplied with power from the A.C. adapter 54. The output terminal 71 of A.C. adapter 54 is connected to a DC-DC converter 72 which converts the output voltage supplied from the A.C. adapter 54 to various levels of voltages, such as 33 V, 12 V, 5 V and −5 V.

The 12 V output terminal 70 of A.C. adapter 54 supplies a voltage to the VTR main body 61 through a line a, and the output terminal 71 supplies a voltage to a heater 74 for heating a cylinder in the VTR main body 51 or to the battery 53 for recharging through a switch SW1, which is operated by a relay 73, and through a line b. The output terminal 71 of A.C. adapter 54 also supplies a voltage to the VTR main body 61 through a transistor Q1, which is turned on during recharging, diode D1 and a line c, and this voltage thus supplied is used for switching between battery recharging operation and VTR operation. A transistor Q2 is provided as connected to the relay 73 for operating the switch SW1 and has its base connected to the collector of transistor Q3, whose base is connected to an ON switch SW2. The base of transistor Q3 is also connected to the collector of transistor Q4, whose base is connected not only to the collector of transistor Q3, but also to an OFF switch SW3 via a diode D2. The collectors of transistors Q3 and Q4 are each connected to the recharging terminal of A.C. adapter 54 through resistors.

Also provided is a transistor Q5 which controls the recharging operation and which has its collector connected to the base of transistor Q1 provided in the voltage supplying line c and its base connected to the collector of transistor Q6, which, in turn, has its base connected to the collector of transistor Q7 and also to a recharging switch SW4 via a diode D3. The base of transistor Q4 is also connected to the switch SW4 through the diode D4. Transistor Q7 has its base connected to the collector of transistor Q6 and also to the switches SW2 and SW3 through diodes D5 and D6, respectively. The collectors of transistors Q6 and Q7 are also connected to the recharging terminal of A.C. adapter 54 via resistors. Also provided is a light receiving element 75 for receiving light emitted from the LED1 of A.C. adapter 54, and an output signal from the light receiving element 75 is applied to the base of transistor Q8 via an amplifier 76. The transistor Q8 has its collector connected to a LED2 which is connected to the collector of transistor Q1 through a diode D7. Connected between the voltage supplying line b and the transistor Q5 is a LED3 which is lit during recharging operation.

In the VTR main body 61, the line a is connected to a switch SW6 by the switch SW5. That is, the switch SW5 functions such that it causes the switch SW6 to be connected to the line a when a connection from the tuner 62 is established by a connector and it causes the switch SW6 to be connected to the battery 53 if no connection to the tuner 62 is established. The switch SW6 is provided in a relay 77 which also includes a switch SW7, which is operated in association with the switch SW6. There is provided an ON switch SW8 which causes the relay 77 to operate to have both of the switches SW6 and SW7 turned on by means of a coil L2 and which is connected to an ON contact point of switch SW5. Also provided is an OFF switch SW9 which causes the relay 77 to operate to have both of the switches SW6 and SW7 turned off by means of a coil L3 and which is connected to an ON contact point of switch SW6 through a diode D8 and to a CHG contact point of switch SW10 through a diode D9. The ON contact point of switch SW6 is connected to a VTR load 78 and also to a display element 79 of tuner 62 via a diode D10. To the ON contact point of switch SW6 is connected a capacitor C.

The voltage supplying line b is selectively connected to the heater contact or to the battery recharging contact point CHG through the switch SW10 which is operated by a relay 80 in the VTR main body 61. The contact point CHG may be connected to the battery 53 through the switch SW7. At the side of the VTR main body 61, the voltage supplying line c is connected to a coil L4 of relay 80 through the transistor Q11 and to the base of transistor Q12. The transistor Q11 has its base connected to the ON contact point of switch SW6 through a diode D11. The transistor Q12 is connected to the CHG contact of switch SW10 through the coil L3 of relay 77 and the diode D9.

Figure 12A:
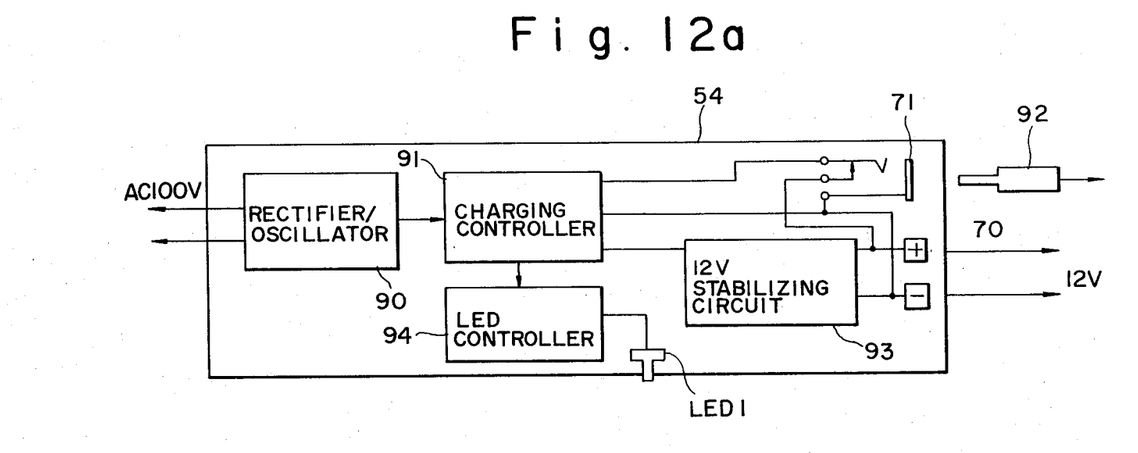
FIG. 12a is a block diagram showing an A.C. adapter constructed in accordance with one embodiment of the present invention.

FIG. 12a shows an embodiment of A.C. adapter 54 according to the present invention. As shown, the A.C. adapter 54 includes a rectifire/oscillator 90 which receives A.C. 100 V and produces a predetermined D.C. voltage. For example, for the purpose of compactization, use is made of a switching regulator so that, after A.C. 100 V is rectified and set to a predetermined voltage by oscillation, it is again converted to a D.C. voltage through a transformer. Also provided in the A.C. adapter 54 is a charging controller 91 which is activated when a jack 92 is fitted into the connector 71, thereby providing a voltage, such as 14.8 V, required for charging the battery. When the jack 92 is pulled out, the charging controller 91 becomes connected to a 12 V stabilizing circuit 93 thereby serving as a 12 V stabilized power source. The state of LED1 is controlled by a LED controller 94 and it is lit during recharging operation or VTR operation and extinguished while the VTR is inoperative or upon completion of recharging.

Figure 12B:
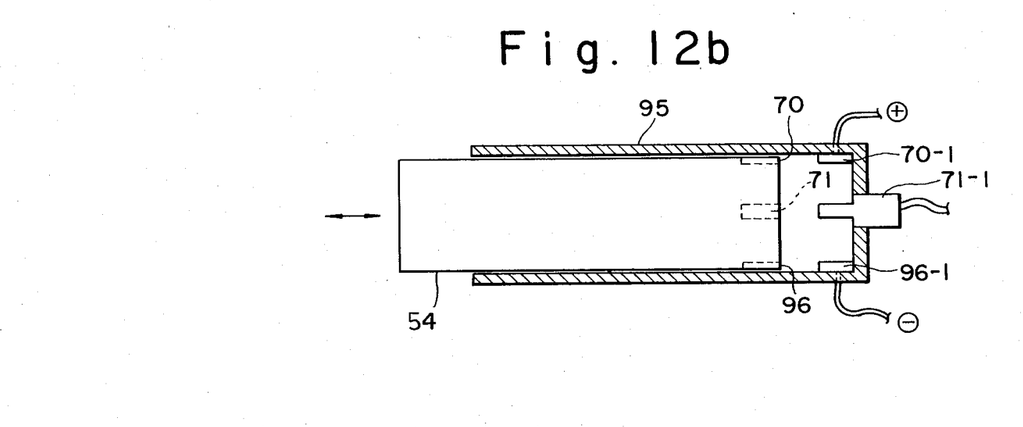
FIG. 12b is a schematic illustration in cross section showing how the A.C. adapter of FIG. 12a is inserted in position.

As shown in FIG. 12b, the A.C. adapter 54 can be set in position by having it inserted into a case 95 defined in the tuner 62. It may, for example, be so structured that, when the adapter 54 is inserted, a charging jack 71-1 comes to be inserted into the connector 71 and terminals 70-1 and 96-1 come to be in contact with 12 V supply terminals 70 and 96, respectively, with the jack 71-1 and terminal 70-1 being connected to the switch SW1 of FIG. 11.

In operation, it will first be described as to the case of recording or reproducing a T.V. program. When the ON switch SW2 of tuner 62 is turned on, the transistor Q3 is turned off so that the transistors Q2 and Q4 are turned on. Turning on of transistor Q2 causes current to flow through the coil L so that the relay 73 is actuated to have the switch SW1 connected to the ON side thereby allowing a voltage to be supplied to the line a from the A.C. adapter 54. In this manner, when the terminal 71 of A.C. adapter 54 is connected to the ON contact, it cooperates with the terminal 70 to provide a supply voltage of 12 V, and a supply voltage of 14.8 V is provided when connected to the CHG contact. This supply voltage of 12 V is applied to the switch SW6 through the switch SW5 in the VTR main body 61. Then, when the switch SW8 of VTR main body 61 is turned on, current flows through the coil L2 to actuate the relay 77 so that the switches SW6 and SW7 are turned to the ON sides thereby providing a supply voltage to the VTR load 78. At the same time, current flows through the diode D10 to the display unit 79 thereby having the display unit lit.

In order to stop the operation of VTR main body 61, it is only necessary to turn the switch SW9 on. When done so, current flows through the coil L3 so that the relay 77 is actuated to have the switches SW6 and SW7 turned to the OFF side thereby ceasing the supply of voltage to the VTR load 78 and extinguishing the display unit 79. Independently of as to whether the VTR main body 61 is either operative or inoperative, when the switch SW3 of tuner 62 is turned on, the transistor Q2 is turned off so that the switch SW1 is switched to the CHG side thereby allowing a voltage to be supplied to the heater 74 of VTR main body 61 through the line b.

When the battery 53 is to be recharged, it only requires that the switch SW4 of tuner 62 be turned on. When so operated, the base voltage of transistor Q4 decreases through the diode D4 to have the transistor Q4 turned off, and, as a result, the switch SW1 causes the charging terminal 71 of A.C. adapter 54 to be connected to the CHG contact thereby allowing a recharging voltage of 14.8 V to be applied to the switch SW10 through the line b. When the switch SW4 is turned on, the transistor Q6 is turned off, which causes the transistor Q5 to be turned on, which, in turn, causes the transistor Q1 to be turned on thereby allowing a voltage of 14.8 V to be supplied to the VTR main body 61 through the diode D1 and the line c. In the VTR main body 61, a higher voltage is applied to the emitter than the base of transistor Q11 14.8 V to emitter and 12 V to base ) so that the transistor Q11 is turned on thereby causing current to flow through the coil L4 via the transistor Q11, whereby the switch SW10 is connected to the CHG contact. The current from the transistor Q11 flows into the base of transistor Q12 to have it turned on thereby allowing current to flow from the CHG contact of switch SW10 to the transistor Q12 through the diode D9 and the coil L3 of relay 77, so that the switches SW6 and SW7 are connected to the OFF side. With this, even if the VTR main body 61 is in operation, it is forced into an inoperative state by the switching operation of the switch SW6 and a recharging voltage is supplied to the battery 53 from the CHG contact of switch SW10 via the switch SW7.

During recharging operation, current flows to the LED3 to have it lit, and since the LED1 of A.C. adapter 54 is lit, the transistor Q8 is turned on thereby allowing current to flow to the LED2 through the diode D1 to have the LED2 also lit. Upon completion of recharging, the LED1 is extinguished and thus the LED2 is also extinguished. Thus, if the LED2 is mounted at the front exterior side of tuner 62, the operator can know the status, for example, as to whether the battery is being recharged or it has been completed.

The LED1 of A.C. adapter 54 remains on even while the VTR main body 61 is in operation, but, in this case, since the transistor Q1 in the line c is off, the LED2 is not lit.

If it is desired to terminate the recharging operation, it is only necessary to have the switch SW3 of tuner 62 turned on. With this, the transistor Q7 is first turned off, and then the transistor Q6 is turned on, which causes the transistor Q5 turned off thereby having the recharging operation terminated.

As described above, in accordance with this aspect of the present invention, it is so structured that power is supplied from an A.C. adapter or battery also in the tuner 62. Various levels of voltages are required at the tuner 62, the A.C. adapter or battery only supplies a single voltage, e.g., 12 V. However, in the present invention, there is provided a DC-DC converter in the tuner 62 thereby allowing to provide various levels of voltage, such as 33 V, 12 V, 5 V and −5 V, in various parts of the tuner 62. In the illustrated embodiment, it is so structured that the voltage supplying line c is commonly used for the case of supplying current from the tuner 62 to the VTR main body 61 during battery recharging operation and for the case of supplying current for lighting the display unit 79 from the VTR main body 61 to the tuner 62 during VTR operation, whereby switching between these modes of operation is carried out by the transistor Q11 and diodes D10 and D11. That is, during battery recharging operation, a voltage of 14.8 V which is higher than the base voltage of 12 V is applied to the emitter of transistor Q11 to have the transistor Q11 turned on; on the other hand, during VTR operation, the same voltage is applied to the emitter and base of transistor Q11 through diodes D10 and D11, respectively, so that the transistor Q11 is turned off.

Figure 13:
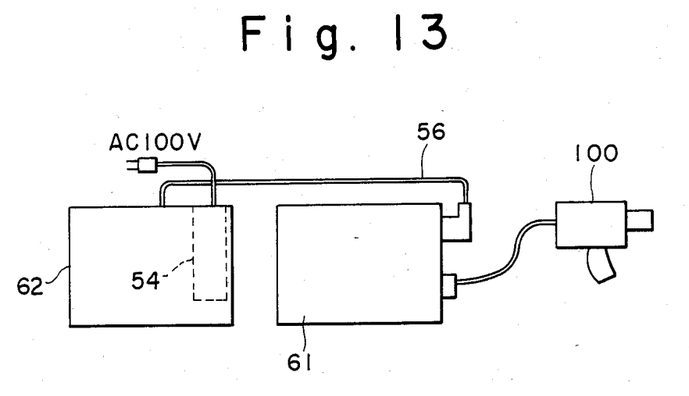
FIGS. 13 through 15 are schematic illustrations each showing how the present invention is used.

Several other embodiments of this aspect of the present invention will be described with reference to FIGS. 13 through 15. FIG. 13 is the case in which both of the VTR main body 61 and tuner 62 are used. In this case, the A.C. adapter 54 or battery 53 is inserted in the tuner 62, and an electrical connection between the tuner 62 and the VTR main body 61 is established through a cable-connector combination 56. With such a structure, recording and reproducing of T.V. programs and recording and reproducing using a camera 100 can be carried out. Furthermore, with the A.C. adapter 54 inserted in the tuner 62 and the battery 53 inserted in the VTR main body 61, recharging of battery 53 can be carried out.

Figure 14:
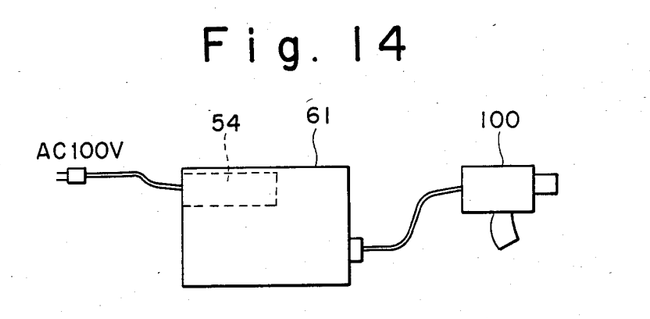
Figure 15:
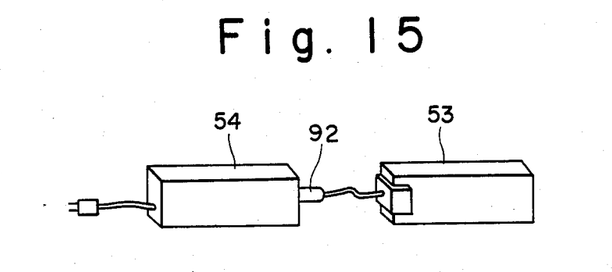

FIG. 14 shows the case in which only the VTR main body 61 is used. In this case, the A.C. adapter 54 or battery 53 is inserted in the VTR main body 61 for carrying out reproducing operation of recorded tape or recording and reproducing operations using the camera 100. FIG. 15 shows the case in which the jack 92 is inserted into the A.C. adapter 54 to have the battery 53 directly connected to the A.C. adapter 54 thereby allowing to have the battery 53 recharged.

As described above, in accordance with this aspect of the present invention, it is only required to provide either an A.C. adapter or a battery as a power source thereby making it unnecessary to provide a built-in power supply in the tuner. Thus, a VTR system significant low in cost can be provided. Besides, since the tuner can be battery-driven, T.V. programs can be recorded even out in a field where no commercial line voltage is available using the VTR system of the present invention.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A magnetic recording and reproducing system comprising:
    address generating means for generating a desired address which is comprised of an appropriate number of digits, forming a first part and a second part, and which indicates a location of a recording medium;
    first detecting means provided in a means for moving said recording medium for detecting an approximate location of said recording medium based on an amount of movement of said recording medium;
    second detecting means for detecting a first part of a recorded address recorded on said recording medium;
    first comparing means for comparing the second part of said desired address set by said address generating means with a value detected by said first detecting means, said first comparing means supplying a first coincidence signal when said second part of said desired address agrees with said value detected by said first detecting means;
    second comparing means for comparing the first part of said desired address set by said address generating means with a value detected by said second detecting means, said second comparing means supplying a second coincidence signal when said first part of said desired address agrees with said value detected by said second detecting means; and
    control means for controlling the movement of said recording medium such that said recording medium is moved at a first speed until said first coincidence signal is supplied from said first comparing means and said recording medium is moved at a second speed, which is different from said first speed, until said second coincidence signal is supplied from said second comparing means.

2. The system of claim 1 wherein said recording medium is magnetic recording tape.

3. The system of claim 2 wherein said first part is comprised of first plural top digits of said appropriate number of digits and said second part is comprised of the remaining digits of said appropriate number of digits.

4. The system of claim 3 wherein said first speed is faster than said second speed.

5. The system of claim 4 wherein said second speed is a speed for moving said magnetic tape during reproduction mode of operation.

6. The system of claim 1 wherein said system is a video tape recorder system.

* * * * *